United States Patent [19]
Murphy

[11] Patent Number: 5,509,210
[45] Date of Patent: Apr. 23, 1996

[54] MULTIPLE POSITION LEVEL

[76] Inventor: Timothy K. Murphy, 1307 61st Ave. North, Nashville, Tenn. 37209

[21] Appl. No.: 329,989

[22] Filed: Oct. 27, 1994

[51] Int. Cl.$^6$ .................................................. G01C 9/28
[52] U.S. Cl. .......................... 33/382; 33/379; 33/390
[58] Field of Search ........................... 33/365, 367, 377, 33/379, 381, 382, 389, 380, 383, 384, 385, 386, 387, 388, 390, 273, 451

[56] References Cited

U.S. PATENT DOCUMENTS

| | | | |
|---|---|---|---|
| 38,252 | 4/1863 | Traut | 33/388 |
| 297,574 | 4/1884 | Davis | 33/385 |
| 613,946 | 11/1898 | Starrett | 33/382 |
| 792,821 | 6/1905 | Golightly | 33/383 |
| 796,645 | 8/1905 | Herche | 33/451 |
| 1,267,456 | 5/1918 | Runge | 33/383 |
| 1,418,544 | 6/1922 | Dodge | 33/382 |
| 1,422,231 | 7/1922 | Stanley | 33/390 |
| 5,207,004 | 5/1993 | Gruetzmacher | 33/382 |

FOREIGN PATENT DOCUMENTS

| | | | |
|---|---|---|---|
| 58-178210 | 10/1983 | Japan | 33/379 |
| 130939 | 8/1919 | United Kingdom | 33/379 |
| 534255 | 3/1941 | United Kingdom | 33/379 |
| 2177203 | 1/1987 | United Kingdom | 33/379 |

*Primary Examiner*—William A. Cuchlinski, Jr.
*Assistant Examiner*—G. Bradley Bennett

[57] ABSTRACT

A level for determining the position of an object relative to the gravitational horizontal. The inventive device includes a rectangular frame having a pair of orthogonally oriented vial levels secured thereto which indicate an orientation of the device in a vertical position. A center web extends across the frame and supports a center level within the frame to indicate an orientation of the device in a horizontal position.

4 Claims, 4 Drawing Sheets

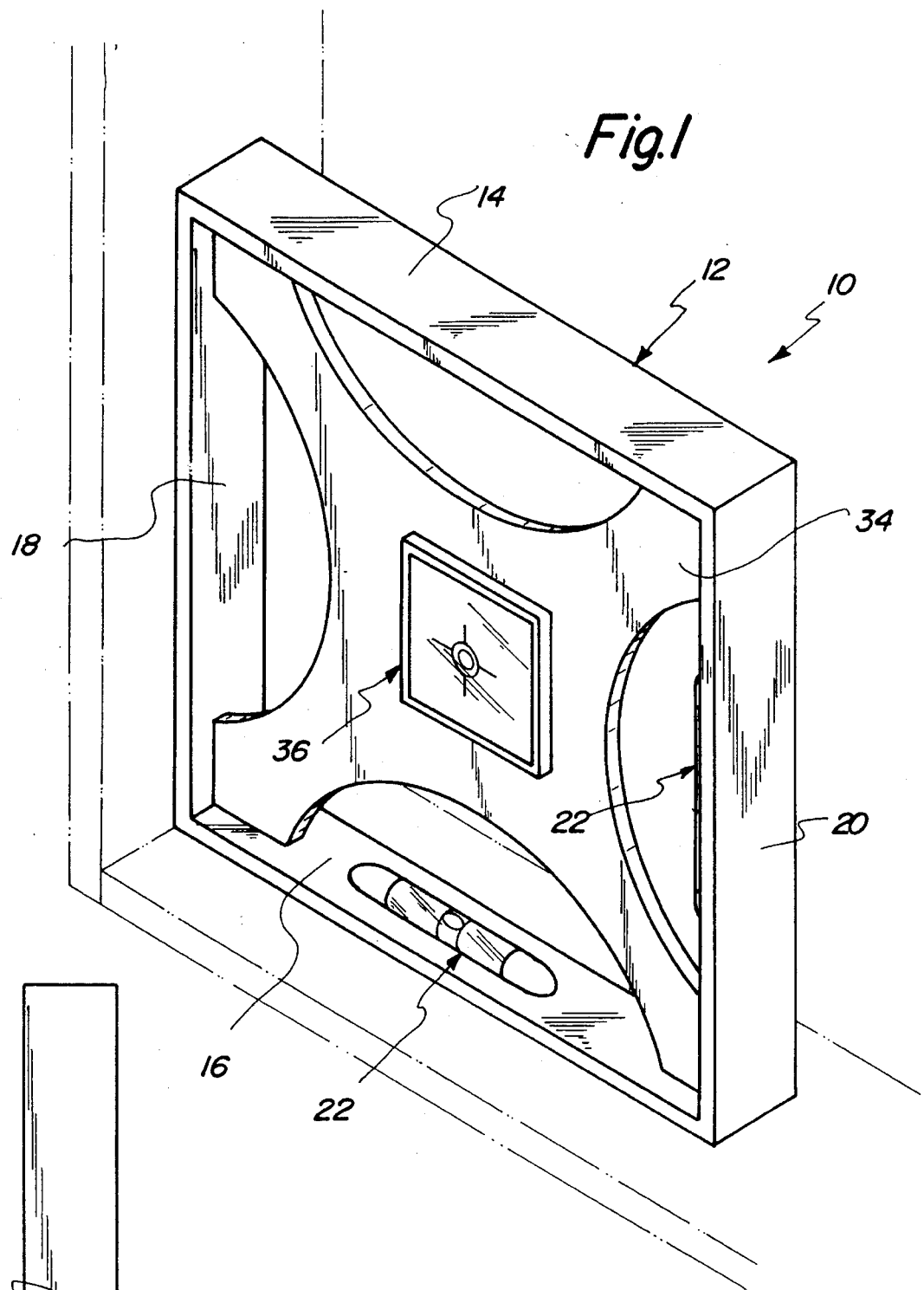
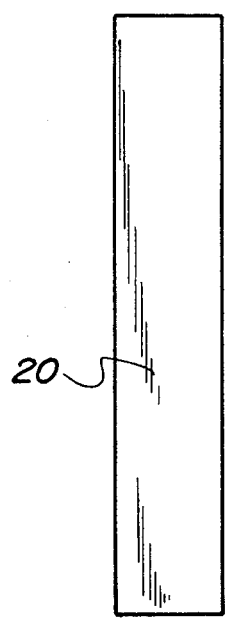
Fig.1
Fig.2

MULTIPLE POSITION LEVEL

BACKGROUND OF THE INVENTION

1. Field of the Invention

The present invention relates to level detecting devices and more particularly pertains to a multiple position level for determining the position of an object relative to the gravitational horizontal.

2. Description of the Prior Art

The use of level detecting devices is known in the prior art. More specifically, level detecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art level detecting devices include U.S. Pat. No. 5,127,167; U.S. Pat. No. 4,531,301; U.S. Pat. No. 3,716,920; U.S. Pat. No. 3,603,000; and U.S. Pat. No. 3,548,508.

While these devices fulfill their respective, particular objectives and requirements, the aforementioned patents do not disclose a multiple level for determining the position of an object relative to the gravitational horizontal which includes a rectangular frame having a pair of orthogonally oriented vial levels secured thereto which indicate an orientation of the device in a vertical position, and a center web extending across the frame and supporting a center level within the frame to indicate an orientation of the device in a horizontal position.

In these respects, the multiple position level according to the present invention substantially departs from the conventional concepts and designs of the prior art, and in so doing provides an apparatus primarily developed for the purpose of determining the position of an object relative to the gravitational horizontal.

SUMMARY OF THE INVENTION

In view of the foregoing disadvantages inherent in the known types of level detecting devices now present in the prior art, the present invention provides a new multiple position level construction wherein the same can be utilized for determining a position of an object relative to the gravitational horizontal. As such, the general purpose of the present invention, which will be described subsequently in greater detail, is to provide a new multiple position level apparatus and method which has many of the advantages of the level detecting devices mentioned heretofore and many novel features that result in a multiple position level which is not anticipated, rendered obvious, suggested, or even implied by any of the prior art level detecting devices, either alone or in any combination thereof.

To attain this, the present invention generally comprises a level for determining the position of an object relative to the gravitational horizontal. The inventive device includes a rectangular frame having a pair of orthogonally oriented vial levels secured thereto which indicate an orientation of the device in a vertical position. A center web extends across the frame and supports a center level within the frame to indicate an orientation of the device in a horizontal position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multiple position level apparatus and method which has many of the advantages of the level detecting devices mentioned heretofore and many novel features that result in a multiple position level which is not anticipated, rendered obvious, suggested, or even implied by any of the prior art level detecting devices, either alone or in any combination thereof.

It is another object of the present invention to provide a new multiple position level which may be easily and efficiently manufactured and marketed.

It is a further object of the present invention to provide a new multiple position level which is of a durable and reliable construction.

An even further object of the present invention is to provide a new multiple position level which is susceptible of a low cost of manufacture with regard to both materials and labor, and which accordingly is then susceptible of low prices of sale to the consuming public, whereby making such multiple position levels economically available to the buying public.

Still yet another object of the present invention is to provide a new multiple position level which provides in the apparatuses and methods of the prior art some of the advantages thereof, while simultaneously overcoming some of the disadvantages normally associated therewith.

Still another object of the present invention is to provide a new multiple position level for determining the position of an object relative to the gravitational horizontal.

Yet another object of the present invention is to provide a new multiple position level which includes a rectangular frame having a pair of orthogonally oriented vial levels secured thereto which indicate an orientation of the device in a vertical position, and a center web extending across the frame and supporting a center level within the frame to indicate an orientation of the device in a horizontal position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a multiple position level according to the present invention.

FIG. 2 is a side elevation view thereof.

DESCRIPTION OF THE PREFERRED EMBODIMENT

Figure 3:
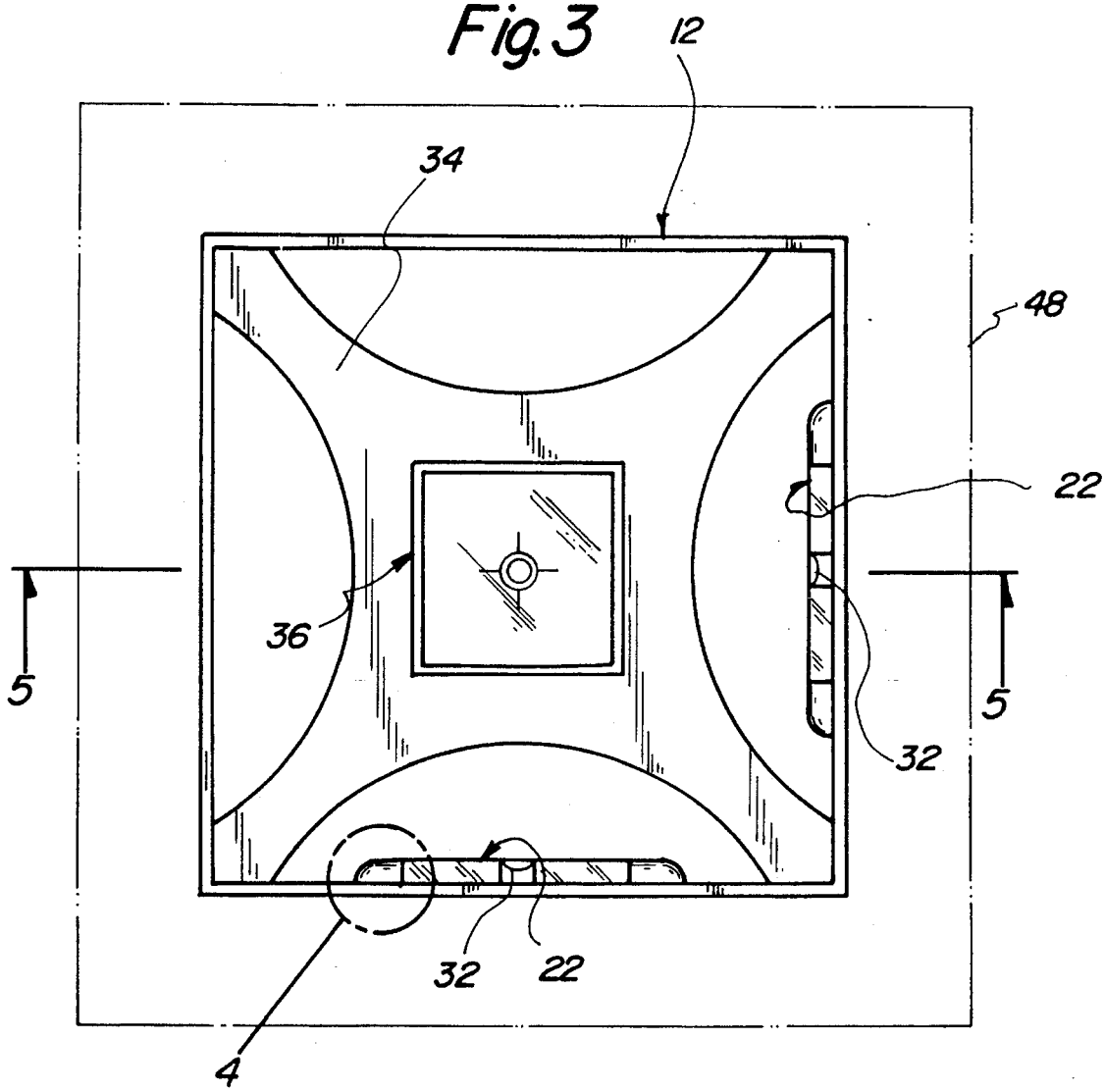
FIG. 3 is a top plan view of the invention.

With reference now to the drawings, and in particular to FIGS. 1–8 thereof, a new multiple position level embodying the principles and concepts of the present invention and generally designated by the reference numeral 10 will be described.

More specifically, it will be noted that the multiple position level 10 comprises a frame means 12 for positioning against an object or upon a support surface to be levelled, as shown in FIG. 1. The frame means 12 preferably comprises a first elongated member 14 spaced from and parallel to a second member 16 of substantially similar configuration. The first member 14 is supported in a spaced and parallel relationship relative to the second member 16 by a third member 18 which orthogonally extends between first ends of the first and second members 14, 16. Similarly, a fourth member 20 extends between second ends of the first and second members 14, 16 to define the substantially rectangular shape of the frame means 12. To this end, the first member 14 and the second member 16 are both of a first length, and the third member 18 and the fourth member 20 are both of a second length. Preferably, the first length is substantially equal to the second length so as to define the substantially square shape of the frame means 12 shown in FIG. 1.

Figure 4:
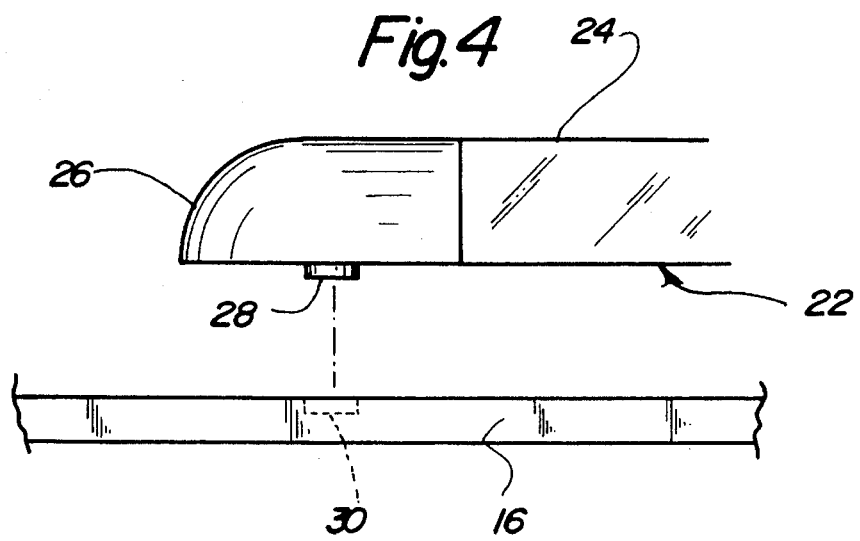
FIG. 4 is an exploded illustration of the area set forth in FIG. 3.

As best illustrated in FIGS. 3 and 4, the present invention 10 additionally comprises a pair of vial levels 22 which are secured in an orthogonal orientation relative to one another along interior surfaces of the frame means 12. To this end, each of the vial levels 22 comprises a hollow glass cylinder 24 having opposed ends, with each of the ends of the glass cylinder having an end cap 26 secured thereto, as shown for one end of the glass cylinder in FIG. 4. The end caps 26 each include a depending projection 28 which extends into a correspondingly shaped cavity 30 formed within the interior surface of the frame means 12. The projection 28 can be secured within the respective cavity 30 by an adhesive, or alternatively, may simply be friction fitted thereinto to permit the selective removal of vial levels 22 from the frame means 12. The vial levels 22 further include a visible fluid positioned within the hollow glass cylinder 24 so as to define an air bubble 32 within the glass cylinder. A pair of unlabelled indicia lines extend about the glass cylinder 24 and are operable to indicate a level positioning of the vial level 22 when the bubble 32 is positioned between the indicia lines. Preferably, a first one of the vial levels 22 is secured to the second member of the frame means 12, and a second one of the vial levels is secured to an interior surface of the fourth member 20. The vial levels 22 are operable to indicate a position of an object relative to the gravitational horizontal when the frame means 12 is positioned in the vertical orientation illustrated in FIG. 1.

As shown in FIG. 3, and particularly illustrated in FIGS. 5 through 8, the frame means 12 further includes a center web 34 extending between the members 14–20. To this end, the center web 34 includes a substantially planar member having a plurality of projecting corners which are fixedly or otherwise secured to the interior surfaces of the members 14–20 at the juncture of two adjacent members. The projecting corners of the center web 34 define a plurality of arcuate cut-outs which permit the mounting of the vial levels 22 along the interior surfaces of the frame means 12. A center level 36 is mounted to the center web 34 and is operable to indicate a position of an object relative to the gravitational horizontal when the device 10 is positioned in a substantially horizontal orientation as shown in FIG. 3.

Figure 5:
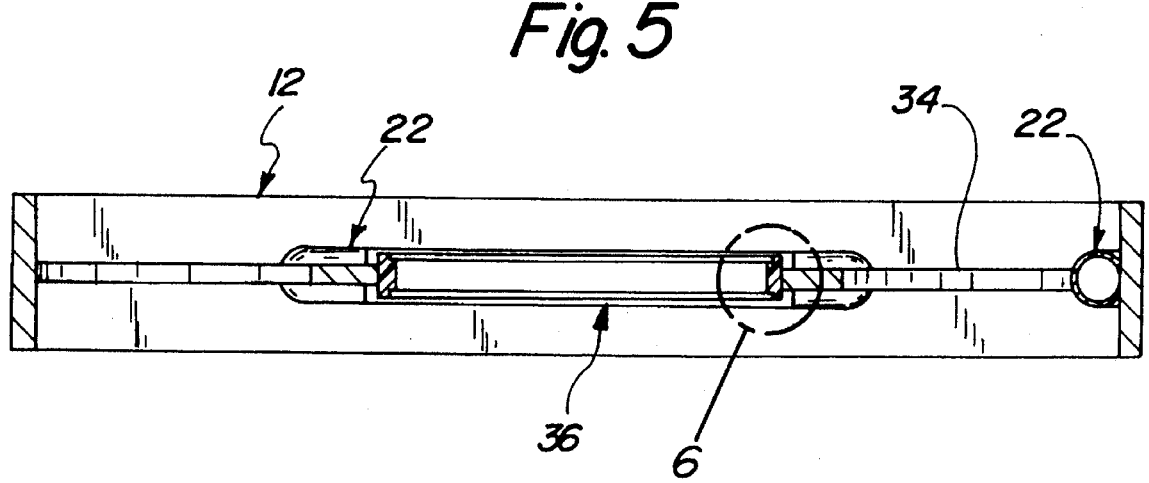
FIG. 5 is a cross-sectional view taken along line 5—5 of FIG. 3.
Figure 6:
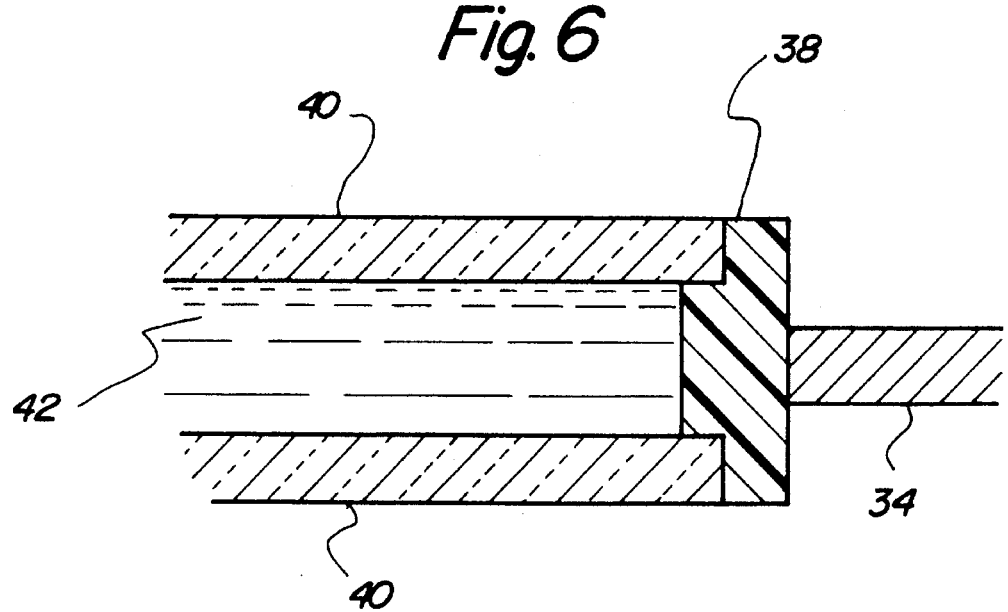
FIG. 6 is an enlarged cross-sectional view of the area set forth in FIG. 5.
Figure 7:
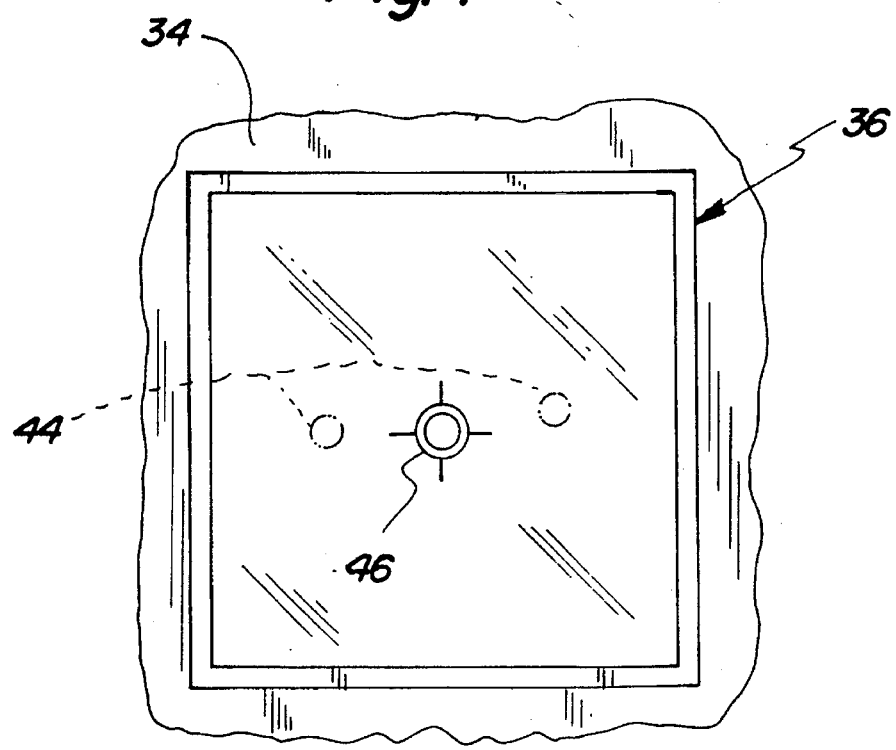
FIG. 7 is an enlarged top plan view of a portion of the present invention.
Figure 7:
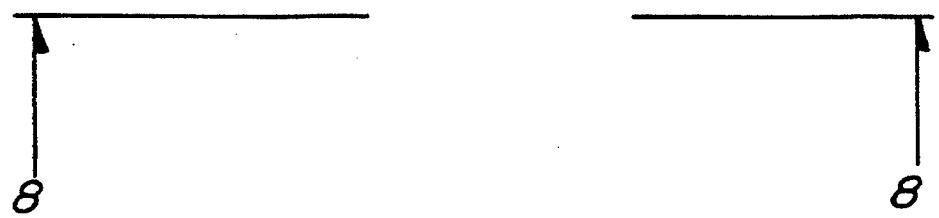
Figure 8:
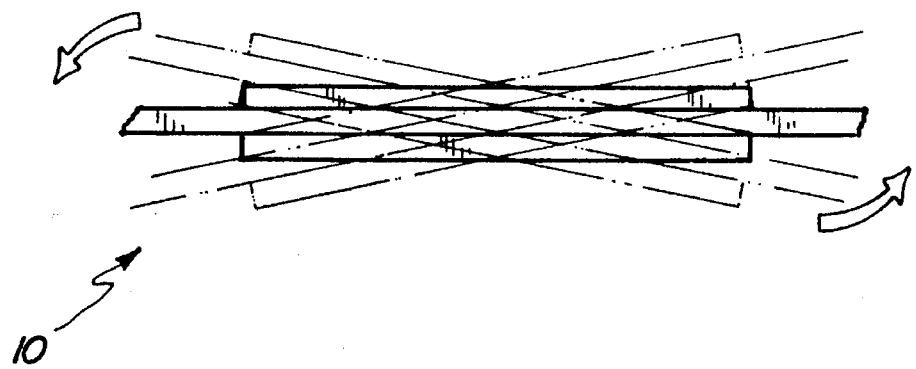
FIG. 8 is a side elevation view of a portion of the present invention as seen from line 8—8 of FIG. 7.

As shown in FIGS. 5 and 6, the center level 36 is comprised of a seal 38 extending about the perimeter of an aperture directed through the planar member portion of the center web 34. Preferably, the seal 38, and correspondingly the aperture extending through the planar member of the center web 34, are substantially square in shape. The center level 36 further comprises a pair of spaced glass plates 40 which are coupled to the seal 38 and cooperate to define an interior space within which a fluid 42 is retained. A bubble 44 (see FIG. 7) is provided within the interior space between the spaced glass plates 40 and is operable to indicate an orientation of the center level 36 relative to the gravitational horizontal. To this end, centering indicia 46 is printed on exterior surfaces of the spaced glass plates 40 and is operable to indicate a centering of the bubble 44 within the center level 36. By this structure, the multiple position level 10 according to the present invention can be placed in a horizontal position along a flat support surface 48, as shown in FIG. 3, to determine the orientation of the flat surface relative to the gravitational horizontal plane. As shown in FIG. 8, the center level 36 is responsive to rotational movements of the device 10 when oriented in the horizontal position shown in FIG. 3.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multiple position level comprising:

a frame means for positioning against an object to be levelled, said frame means comprising a first elongated member spaced from and parallel to a second elongated member; a third elongated member extending orthogonally between first ends of said first and second elongated members; and a fourth elongated member extending orthogonally between second ends of said first and second elongated members, wherein said first member and said second member are both of a first length, and said third member and said fourth member are both of a second length, with said first length being substantially equal to said second length so as to define a substantially square shade of said frame means, said frame means further including a center web extending between said elongated members, said center web including a substantially planar member having a plurality of projecting corners which are fixedly secured to interior surfaces of said elongated members at a juncture of adjacent members, said center web including an aperture directed through said planar member thereof;

a pair of vial levels secured in an orthogonal orientation relative to one another along interior surfaces of said frame means; and, a center level mounted to said frame means, said center level being mounted to said center web of said frame means, said center level comprising a seal extending about a perimeter of said aperture directed through said planar member of said center web; a pair of spaced glass plates coupled to said seal which cooperate to define an interior space; a fluid positioned within said interior space; and a gas bubble positioned within said interior space.

2. The multiple position level of claim 1, wherein a first one of said vial levels is secured to said second elongated member of said frame means, and a second one of said vial levels is secured to said fourth elongated member of said frame means.

3. A multiple position level comprising:

a frame means for positioning against an object to be levelled, said frame means comprising a first elongated member spaced from and parallel to a second elongated member; a third elongated member extending orthogonally between first ends of said first and second elongated members; a fourth elongated member extending orthogonally between second ends of said first and second elongated members, wherein said first member and said second member are both of a first length, and said third member and said fourth member are both of a second length, with said first length being substantially equal to said second length so as to define a substantially square shape of said frame means; and a center web extending between said elongated members, said center web including a substantially planar member having a plurality of projecting corners which are fixedly secured to interior surfaces of said elongated members at a juncture of adjacent members, said center level being mounted to said center web, said center web including an aperture directed through said planar member thereof;

a pair of vial levels secured in an orthogonal orientation relative to one anon,her along interior surfaces of said frame means, with a first one of said vial levels being secured to said second elongated member of said frame means, and a second one of said vial levels being secured to said fourth elongated member of said frame means, each of said vial levels comprising a hollow glass cylinder having opposed ends; an end cap secured to each of said ends of said glass cylinder, said end caps each including a depending projection extending therefrom, said depending projection extending into a correspondingly shaped cavity formed within an interior surface of said frame means; a visible fluid positioned within said hollow glass cylinder; and an air bubble positioned within said hollow glass cylinder; and, a center level mounted to said frame means, said center level comprising a seal extending about a perimeter of said aperture directed through said planar member of said center web; a pair of spaced glass plates coupled to said seal which cooperate to define an interior space; a fluid positioned within said interior space; and a gas bubble positioned within said interior space.

4. A multiple position level comprising:

a frame means for positioning against an object to be levelled, said frame means including a center web, said center web including a substantially planar member having a plurality of projecting members which are fixedly secured to interior surfaces of said frame, said center web including an aperture directed through said planar member thereof; and, a center level mounted to said frame means, said center level being mounted to said center web of said frame means, said center level comprising a seal extending about a perimeter of said aperture directed through said planar member of said center web; a pair of spaced glass plates coupled to said seal which cooperate to define an interior space; a fluid positioned within said interior space; and a gas bubble positioned within said interior space.

* * * * *